(12) United States Patent
Mohaupt et al.

(10) Patent No.: US 10,390,205 B2
(45) Date of Patent: Aug. 20, 2019

(54) BLUETOOTH® CONNECTION SETUP AND BLUETOOTH® DEVICE

(71) Applicant: VOLKSWAGEN AG, Wolfsburg (DE)

(72) Inventors: Matthias Mohaupt, Bochum (DE); Michael Hubo-Kleiss, Hattingen (DE); Dong Nguyen, Castrop-Rauxel (DE)

(73) Assignee: Volkswagen AG (DE)

( * ) Notice: Subject to any disclaimer, the term of this patent is extended or adjusted under 35 U.S.C. 154(b) by 188 days.

(21) Appl. No.: 15/480,431

(22) Filed: Apr. 6, 2017

(65) Prior Publication Data

US 2017/0295599 A1 Oct. 12, 2017

(30) Foreign Application Priority Data

Apr. 7, 2016 (DE) .................. 10 2016 205 830

(51) Int. Cl.
*H04W 8/00* (2009.01)
*H04W 4/80* (2018.01)
*H04W 76/10* (2018.01)
*H04W 84/18* (2009.01)

(52) U.S. Cl.
CPC ............. *H04W 8/005* (2013.01); *H04W 4/80* (2018.02); *H04W 76/10* (2018.02); *H04W 84/18* (2013.01)

(58) Field of Classification Search
CPC ........ H04W 8/005; H04W 4/80; H04W 76/10
USPC .................................. 370/310, 328
See application file for complete search history.

(56) References Cited

U.S. PATENT DOCUMENTS

| | | | |
|---|---|---|---|
| 9,185,745 B2 | 11/2015 | Ghosh et al. | |
| 2011/0021142 A1 | 1/2011 | Desai et al. | |
| 2014/0321321 A1 | 10/2014 | Knaappila | |
| 2014/0328210 A1 | 11/2014 | Knaappila | |
| 2015/0223169 A1 | 8/2015 | Ghosh | |
| 2016/0066137 A1 | 3/2016 | Kulkarni et al. | |
| 2016/0174266 A1* | 6/2016 | Goel | H04W 4/70 455/509 |
| 2017/0353925 A1* | 12/2017 | Trainin | H04W 52/0216 |

FOREIGN PATENT DOCUMENTS

| | | |
|---|---|---|
| DE | 102013209612 A1 | 11/2014 |
| EP | 2672764 A1 | 12/2013 |
| EP | 2739106 A2 | 6/2014 |
| WO | 2016007186 A1 | 1/2016 |

OTHER PUBLICATIONS

Search Report for German Patent Application No. 10 2016 205 830.4; dated Aug. 11, 2016.

* cited by examiner

*Primary Examiner* — Obaidul Huq
(74) *Attorney, Agent, or Firm* — Barnes & Thornburg LLP (57) ABSTRACT

A method for receiving and outputting radio signals to set up a BLUETOOTH® connection which includes receiving, within a predetermined period, at least two of the advertising data packets which originate from a device; determining starting times of the two advertising data packets; and outputting, after the predetermine period, of the device's own advertising data packets, at the device's own starting times which are selected so that the device's own advertising data packets do not chronologically overlap with advertising data packets which are output by the device after the predetermined period.

18 Claims, 4 Drawing Sheets

BLUETOOTH® CONNECTION SETUP AND BLUETOOTH® DEVICE

PRIORITY CLAIM

This patent application claims priority to German Patent Application No. 10 2016 205 830.4, filed 7 Apr. 2016, the disclosure of which is incorporated herein by reference in its entirety.

SUMMARY

Illustrative embodiments relate to a method for receiving and outputting radio signals for setting up a BLUETOOTH® connection and to a BLUETOOTH® device which carries out the method.

BRIEF DESCRIPTION OF THE DRAWINGS

Embodiments are explained with reference to the appended drawings. The disclosure is not limited to the described or illustrated embodiments.

DETAILED DESCRIPTION

EP 2 672 764 A1 describes a method and device for interrupting a wireless close-range communication, wherein a power level of a wireless communication message is measured, and wherein the communication connection is interrupted if the power level is higher than a threshold value. To avoid repeated collisions between devices which wake up simultaneously on the same channel, a device will wait for a reliable time period.

U.S. Pat. No. 9,185,745 B2 discloses a signaling mechanism for wireless networks, wherein a first time window is allocated for a first network, and a second time window for a second network, wherein the networks are operated with different powers.

US 2015/0223169 A1 discloses a method for an initial indication of block allocation within a page for wireless networks, wherein a management frame displays a multiplicity of page layer elements, wherein the multiplicity of page layer elements is periodically output by an access node in a beacon frame to a multiplicity of associated wireless client devices.

BLUETOOTH® is an industrial standard according to IEEE 802.15.1 for transmission of data between devices over a short distance by radio technology (UPAN). BLUETOOTH® devices transmit in the so-called ISM (Industrial, Scientific and Medical) band between 2.402 GHz and 2.480 GHz. During typical data transmissions by means of BLUETOOTH®, a frequency hopping method is used in which the frequency band is divided into 79 frequency operations with a 1 MHz interval. Conventionally, the individual BLUETOOTH® controllers of BLUETOOTH® devices which are operating identify themselves by means of an individual and unmistakable 48-bit long MAC address. Conventionally, a device sets up contact with another device by means of an inquiry message and then by means of a page message.

A secondary form of BLUETOOTH® is BLUETOOTH® Low Energy, referred to for short as BLE, wherein a lower energy consumption than in the classic BLUETOOTH® is required. BLUETOOTH® LE divides the ISM frequency band into 40 channels with a width of 2 MHz. BLUETOOTH® LE also uses a frequency hopping method to avoid collisions. The transmission power of a Bluetooth™ LE device can be 10 mW (10 dBm) at maximum. Conventionally, BLUETOOTH® LE devices output brief advertising events (referred to also as Beacons in this application) independently of one another on one of three advertising channels. The advertising channels are in the ISM frequency band, typically two at the edges of the band and one in the center of the band. Channels 37, 38 and 39 can be used as the advertising channels on which the advertising signals/data packets are transmitted. Subsequently, the device listens on this channel for a connection enquiry, after which there is then a changeover to one of the remaining 37 channels, to carry out a data exchange. The advertising channels are therefore broadcast channels with which data packets can be transmitted from a source to all the reachable or "associated" subscribers of the BLUETOOTH® telecommunication network. Advertising data packets (broadcast data packets) can be transmitted at regular intervals, i.e., periodically, on any advertising channel. A time interval between successive advertising data packets can comprise both a fixed interval and an additional random delay. A standard advertising data packet comprises a payload of at maximum 31 bytes for data which describe the sender and its capabilities. It is therefore also possible to transmit any desired user-defined information to other devices. If the standard 31-byte payload is not large enough for the data, BLE also supports an optionally secondary advertising payload.

In the field of motor vehicle technology, sensors which make use of the BLUETOOTH® Low Energy (BT LE) radio technology to transmit their measurement signals to other components of a motor vehicle, such as, for example, control units, are being used more and more frequently. To establish a connection, the BLUETOOTH®-supported sensors output the advertising signals (also referred to as beacons) in a chronologically periodic manner. The time interval between two successive beacons is referred to below as interval in accordance with the BLUETOOTH® specification.

It has been observed that the connection setup between two BLUETOOTH® devices, in particular, between two BLUETOOTH® LE devices which intend to exchange data cannot be implemented without interference, reliably and rapidly in all cases. If a relatively large number of BLUETOOTH® devices are arranged one next to the other, a connection setup is made more difficult and it can take a long time.

Disclosed embodiments provide a method for receiving and outputting radio signals to set up a BLUETOOTH® connection and a BLUETOOTH® device, wherein a connection setup can be achieved in a reliable and rapid manner.

According to at least one disclosed embodiment, a method for receiving and outputting radio signals to set up a BLUETOOTH® connection is made available. The method comprises receiving (in a way which is compatible with BLUETOOTH® LE), within a predetermined period, at least two of the advertising data packets (also referred to as beacon or broadcast data packets) which originate from a BLUETOOTH® device. According to the method, in each case a starting time (that is to say time of starting) of each of the two advertising data packets is determined. After the predetermined period, the method further comprises outputting (in a way which is compatible with BLUETOOTH® LE) of the device's own advertising packets at the device's own starting times, which are selected in such a way that the device's own advertising data packets do not chronologically overlap with advertising data packets which are output by the BLUETOOTH® device after the predetermined period.

The method can be carried out, for example, by a BLUETOOTH® device, in particular, a BLUETOOTH® LE device, for example, within or in the surroundings of a motor vehicle. The BLUETOOTH® device which the method carries out can be installed here, for example, in the motor vehicle or be a BLUETOOTH® device which is external to the motor vehicle but which wishes to set up a connection to another BLUETOOTH® device which is associated with the vehicle. The BLUETOOTH® device which is installed in the motor vehicle can transmit, for example, measured values of measuring sensors, for example, tire pressure sensors, rotational speed sensors, exhaust gas pressure sensor, fuel pressure sensors or the like to another BLUETOOTH® device. The method can be carried out in other embodiments by a BLUETOOTH®-supporting keypad or cellphone or a charging station for charging electrical energy.

The predetermined period can be fixedly set, in particular, saved, in the device which executes the method. The predetermined period can be dimensioned such that it is ensured that at least two advertising data packets which are output by one and the same device can be received. It is therefore ensured that the interval which generally passes between the two advertising data packets can be reliably determined. This facilitates the selection of the device's own starting times at which the device's own advertising data packets are to be output without giving rise to data collisions with the advertising data packets which are output via the (other) device. To set up a connection it is possible to reserve, for example, even more extra space after the device's own advertising packet so that the device to be connected can transmit a CONNECT_REQ directly after without collisions. The starting times can define the start of the respective advertising data packets or, for example, also a chronological mean point of the respective advertising data packets. If the (extraneous) starting times are determined, the device's own starting times can easily be selected to reduce a collision between the device's own advertising data packets and the extraneous advertising data packets. After the at least two advertising data packets have been received within the predetermined period, there can be a subsequent processing period before the device's own advertising data packets are output. The processing period can be necessary to determine the device's own starting times from the determined starting times (and further parameters) of the two advertising data packets, in such a way that a collision is (largely) avoided.

After the device's own advertising data packets have been output without an overlap with any other advertising data packets (and the same advertising channel), a setup of a BLUETOOTH® connection can be continued in a conventional way. After the setup of the BLUETOOTH® connection, an exchange of useful data can be carried out between the BLUETOOTH® devices which have set up the BLUETOOTH® connection.

According to the method, it is possible to receive, within the predetermined period, further advertising data packets which originate from at least one other device (or a plurality of other devices), that is to say have been output thereby. According to the method, further starting times of the further advertising data packets can be determined, in particular, in each case pairs of starting times of those further advertising data packets which have been output by one and the same other device. The device's own starting times can also be selected such that the device's own advertising data packets do not chronologically overlap with further advertising data packets which have been output by the at least one further device after the predetermined period. Therefore, collisions during a BLUETOOTH® connection setup can be avoided even in the presence of a multiplicity of BLUETOOTH® devices which output advertising data packets.

According to at least one disclosed embodiment of the method, the receiving of the two advertising data packets and/or of the further advertising data packets can comprise receiving (all possible types of) data packets and analyzing the data packets to determine whether they are advertising data packets. BLUETOOTH® data packets can comprise, for example, a data field which identifies the type of the data packet or makes it possible to derive the type. According to the method, this data field can be read out by all possible received data packets. The respectively received data packet can be taken into account further, for example, only if it is actually an advertising data packet. Therefore, it is possible to suppress interference signals, which can make the method more reliable.

According to at least one disclosed embodiment, the receiving of the advertising data packets which originate from the device and/or the other device can also comprise analyzing the advertising data packets, to determine an MAC address of the outputting device. The advertising data packets can comprise, for example, a data field or a data range which identifies a uniquely defined address, such as, for example, the MAC address of the outputting device. If two advertising data packets which contain the same MAC address are received, it is therefore ensured that these two advertising data packets have been output via one and the same device. The determined starting times of these advertising data packets which contain the same MAC address can then be assigned to one and the same device also to determine an interval between the two advertising data packets which originate from the same device.

Therefore, future starting times of the advertising data packets of this BLUETOOTH® device can be predicted reliably, for example, from the first starting time and the (constant) interval (multiplied by an integer) between the two received advertising data packets. Therefore, a collision of the device's own advertising data packets with extraneous advertising data packets can be more easily prevented.

The method can also comprise determining a respective data packet period of the two advertising data packets and/or the further advertising data packets. In addition, the outputting of the device's own advertising data packets can take place at the device's own starting times as a function of the data packet period and/or the further data packet period. The device's own starting times can be positioned, for example, in such a way that after the starting times of the extraneous advertising data packets they lie to a greater extent around the respective data packet period of the respective advertising data packets. Therefore, a simple algorithm can be made available to determine, in particular, calculate, the device's own starting times.

According to at least one disclosed embodiment, the method can also comprise determining an interval between the two advertising data packets from the starting times. In addition at least one further interval between two of the further advertising data packets can be determined from the further starting times. According to this disclosed embodiment, the device's own advertising data packets can be output periodically, wherein between two of the device's own advertising data packets there is a separate interval which is selected as a function of the interval and/or of the at least one further interval. Therefore, collisions can be avoided more easily. According to at least one disclosed embodiment, the device's own interval is permanently predefined in the device which executes the method, preset and stored. In this case, a reduction or even an avoidance of collisions can be brought about by virtue of the fact that only the device's own first starting time is determined and the device's own other starting times of the advertising signals occur inevitably as a result of the permanently set separate interval.

According to another disclosed embodiment in which the device's own interval is also permanently predefined, collisions are avoided by virtue of the fact that both the device's own first starting point as well as the device's own data packet period of its own advertising data packets are determined in such a way that a chronological overlap of the device's own advertising data packets with extraneous advertising data packets is (largely) avoided.

According to at least one disclosed embodiment, the device's own interval (chronological gap between two of the device's own advertising data packets) can be freely selected or can be selected within certain limits. In such disclosed embodiments, the device's own interval can be selected in such a way that the device's own interval is an integral multiple of the interval or of the further interval. With such a selection of the device's own interval, if there is no collision after the predetermined period in a starting time window which lasts for the predetermined period, there are also no collisions between the device's own advertising data packets and extraneous advertising data packets at any time in the future (assuming that the respective advertising data packets are output in a strictly periodic manner with the respective intervals). An overlap of the device's own advertising data packets with extraneous advertising data packets can be avoided by suitably shifting the device's own starting times and suitably selecting the device's own data packet period within the starting time window.

In other disclosed embodiments, the device's own interval can be selected such that the interval or further interval is an integral multiple of the device's own interval. Then, checking can be carried out to determine whether an overlap with extraneous advertising data packets would occur when the device's own advertising data packets are output at the device's own starting times at specific times after the starting time window. If an overlap were to occur with extraneous advertising data packets, either a time shift of the device's own starting times or a change in the device's own interval can be performed.

According to at least one disclosed embodiment, the receiving of the at least two advertising data packets can comprise listening, for the predetermined period, on at least one channel (compatible with BLUETOOTH® LE) of an advertising frequency range. In this connection, the outputting of the device's own advertising data packets after the predetermined period can occur in the advertising frequency range, that is to say in the same frequency range in which listening or listening in was previously carried out. The receiving and outputting of the data packets can take place according to "Directed high duty cycle advertising" of BLUETOOTH® Low Energy, in particular, according to the specification of June 2010. It is possible to provide precisely three advertising frequency ranges (also referred to as channels) for the advertising. If a number which is higher than a threshold value of advertising data packets of a number which is higher than a threshold value of other devices are received on one of the advertising frequency ranges, it is possible to switch over to another advertising frequency range of the possible advertising frequency ranges and to repeat the method, to achieve a connection setup all the more quickly.

The predetermined period for which listening in can be carried out, can be at least twice a maximum interval of the periodic outputting of advertising data packets. The maximum interval can be, for example, 3.75 ms, with the result that the predetermined period can be 7.5 ms. If listening is therefore carried out for 7.5 ms on an advertising frequency range, it is ensured that at least two advertising data packets which are output periodically by a single device can be received. Therefore, all the relevant parameters of these advertising data packets, for example, data packet period, starting times and interval, can be determined. The method can therefore be operated reliably.

It should be understood that features which are described, explained, made available or applied in conjunction with a method for receiving and outputting radio signals for setting up a BLUETOOTH® connection, likewise individually or in any combination on a BLUETOOTH® device, can be applied according to a disclosed embodiment, and vice versa.

According to at least one disclosed embodiment, a BLUETOOTH® device, in particular, a BLUETOOTH® LE device, is made available which has a receiver which is designed to receive within a predetermined period, at least two of the advertising data packets which originate from another BLUETOOTH® device. The BLUETOOTH® device also has a processor (comprising hardware and/or software) which is designed to determine starting times of the two advertising data packets. In addition, the BLUETOOTH® device is a transmitter which is designed to output, after the predetermined period, the device's own advertising data packets at the device's own starting times which are selected by the processor in such a way that the device's own advertising data packets do not chronologically overlap with advertising data packets which are output by the other device after the predetermined period.

The device can be installed, for example, in a cellphone, in a motor vehicle, in a motor vehicle key or in a charging station for charging electrical energy.

Figure 1:
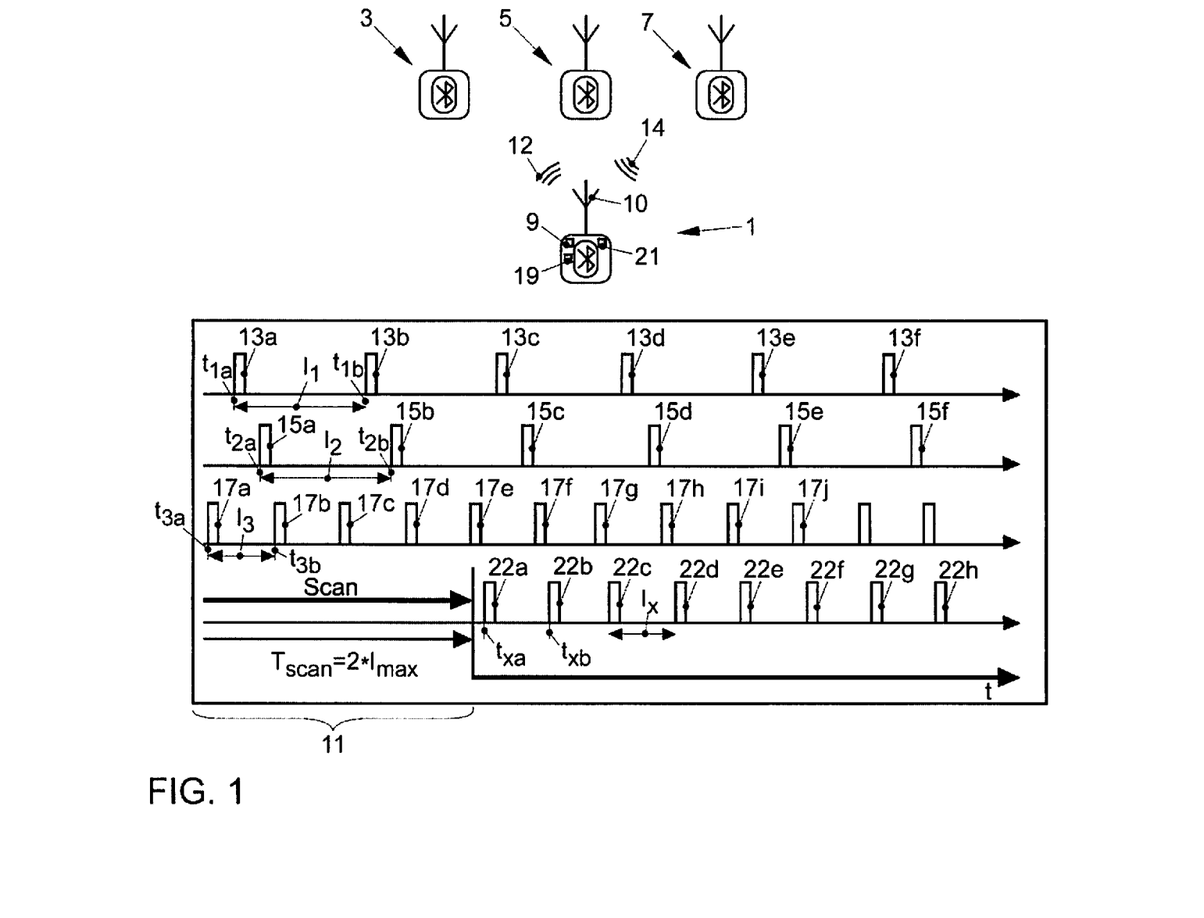
FIG. 1 is a schematic illustration of a BLUETOOTH® device according to a disclosed embodiment together with further BLUETOOTH® devices, wherein the BLUETOOTH® device executes a method for receiving and outputting radio signals for setting up a BLUETOOTH® connection according to a disclosed embodiment.

FIG. 1 is a schematic illustration of a BLUETOOTH® device 1 according to a disclosed embodiment together with further BLUETOOTH® devices 3, 5 and 7, wherein the BLUETOOTH® device 1 executes a method for receiving and outputting radio signals for setting up a BLUETOOTH® connection according to a disclosed embodiment.

For this purpose, the BLUETOOTH® device 1 comprises a receiver 9 which comprises an antenna 10 and reception electronics (not explicitly illustrated). The receiver 9 is designed to receive, within a predetermined period Tscan (also referred to by reference number 11) at least two of the advertising data packets 13*a*, 13*b* (contained in the radio signal 14) which originate from one of the devices 3, 5, 7, for example, device 3. The receiver 9 of the BLUETOOTH® device 1 also receives in each case at least two advertising data packets 15a, 15b from the BLUETOOTH® device 5 and also receives at least two advertising data packets 17a, 17b from the BLUETOOTH® device 7. In this context, the predetermined period Tscan is given by Tscan=2×Imax, wherein Imax represents a maximum interval of successive advertising data packets as assisted by the protocol.

The BLUETOOTH® device 1 also comprises a processor 19 which is designed to determine starting times t1a, t1b of the two advertising data packets 13a, 13b. The BLUETOOTH® device 1 also comprises a transmitter 21 which is connected to the antenna 10 and is designed to output, after the predetermined period 11, the device's own advertising data packets 22a, 22b (contained in radio signals 12) at the device's own starting times txa, txb. These starting times of the actual device are selected here by the processor 19 (with the aid of the advertising starting times t1a, t1b and optionally also with the aid of the starting times of the other advertising data packets 15a, 15b, 17a, 17b) such that the device's own advertising data packets 22a, 22b do not chronologically overlap with advertising data (for example, 13c, 13d, 13e, 13f) which are output by the respective other device (that is to say the devices 3, 5, 7) after the predetermined period 11.

Figure 2:
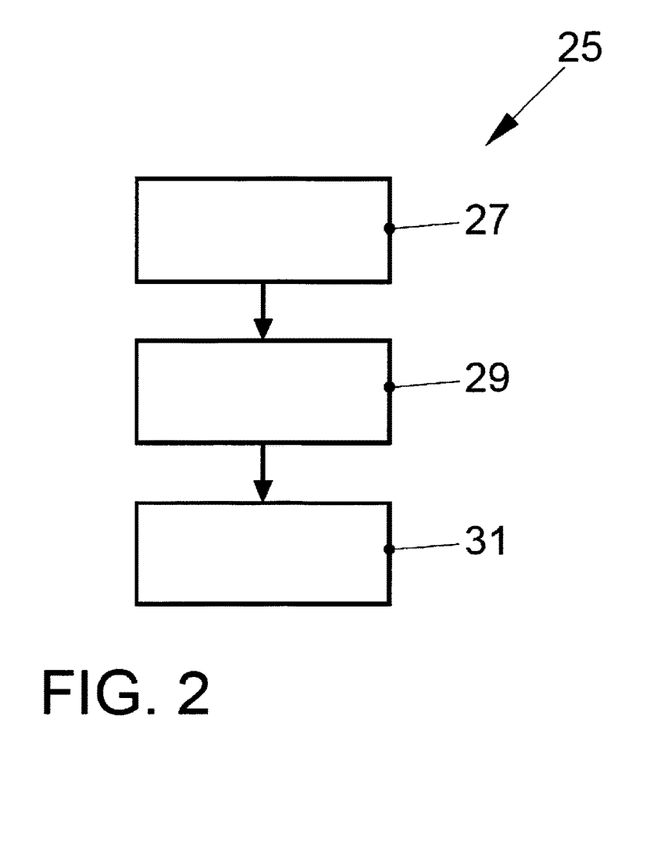
FIG. 2 illustrates method operations of a disclosed method for receiving and outputting radio signals for setting up a BLUETOOTH® connection according to a disclosed embodiment which is carried out, for example, by the BLUETOOTH® device of FIG. 1.

FIG. 2 illustrates method operations of a method 25 according to a disclosed embodiment which is designed to carry out the BLUETOOTH® device 1 (illustrated in FIG. 1). In a method operation at 27, at least two advertising data packets which originate from a (single other) device are received within a predetermined period. In a subsequent method operation at 29, starting times of the two advertising data packets are determined for, for example, the starting times t1a, t1b of the advertising data packets 13a, 13b which have been output by the BLUETOOTH® device 3, as illustrated in FIG. 1. In a further method operation at 31, advertising data packets 22a, 22b are output by the BLUETOOTH® device 1 which is illustrated in FIG. 1, after the predetermined period at the device's own starting times txa, txb which is selected here in such a way that the device's own advertising data packets 22a, 22b do not overlap chronologically with advertising data packets (for example, data packets 13c, 13d, 13e, 13f or else data packets 15c, 15d, 15e, 15f or else data packets 17f, 17g etc.) which are output after the predetermined period.

Figure 3:
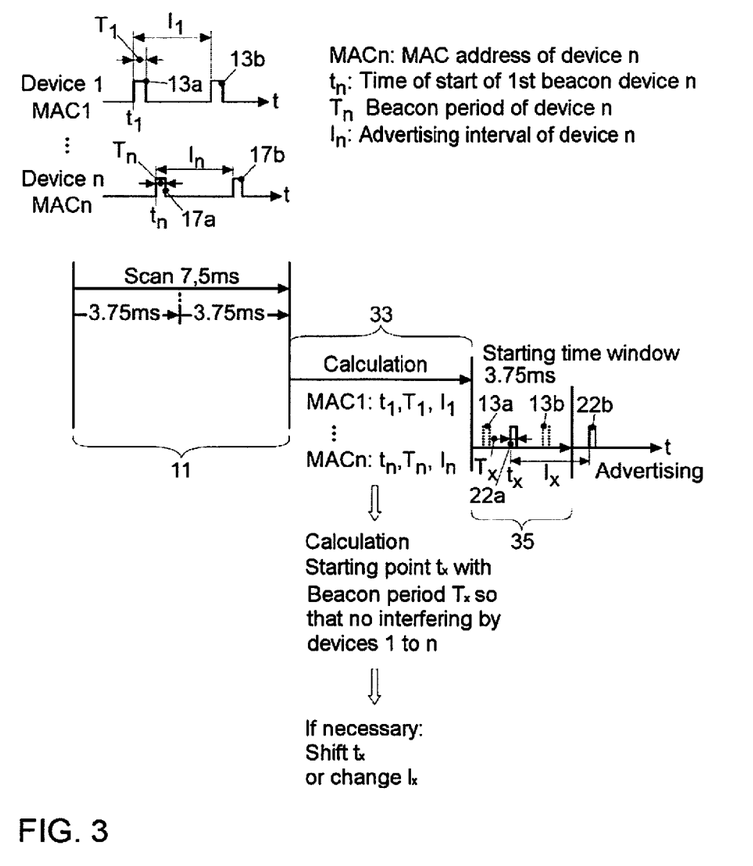
FIG. 3 is a schematic illustration of method operations of a method according to a disclosed embodiment.

FIG. 3 illustrates in an alternative illustration an embodiment of a method for receiving and outputting radio signals for setting up a BLUETOOTH® connection. A first device (device 3 in FIG. 1) transmits, at a starting time t1, an advertising data packet 13a which has a data packet period T1. After an interval I1, a further advertising data packet 13b is output in a periodically recurring manner.

Further devices can output, within the predetermined period 11, further advertising data packets with determined intervals between them. An n-th device (for example, device 7 of FIG. 1) transmits, at a starting time tn, an advertising data packet 17a which has a data packet period Tn. An interval In after the advertising data packet 17a has been output, outputs the n-th device a further advertising data packet 17b. All the advertising data packets which have been output by the first device, the second device up to the n-th device within the predetermined period 11, are received according to the method of a disclosed embodiment, for example, by the BLUETOOTH® device 1 which is illustrated in FIG. 1, and evaluated. The evaluation is carried out here in an evaluation time window 33, as illustrated in FIG. 3.

As a result of the evaluation, the MAC address of the respective device, the time tn of the start of the first advertising data packet (also referred to as a beacon), the data packet period Tn (also referred to as a beacon period) of the respective device and the interval In between two successive advertising data packets (also referred to as an advertising interval) of the respective device is present for all n devices.

In the text which follows, a starting point tx of a BLUETOOTH® device, which wishes to carry out a setup of a BLUETOOTH® connection, is calculated from the determined or calculated data. In addition, the beacon period (also referred to as the data packet period) Tx is calculated from the data. The starting point and the beacon period are calculated in such a way that no disruption is caused by the n devices 1 to n. If it is necessary, the starting time can be shifted and/or the data packet period Ix can be changed.

As is apparent from FIG. 3, the BLUETOOTH® device which would like to set up a BLUETOOTH® connection starts, in a starting time window 35, to output its own advertising data packets 22a, 22b which have a data packet period of Tx and a mutual distance, that is to say chronological gap of Ix. As is apparent from FIG. 3, the device's own advertising data packets 22a, 22b do not overlap with the extraneous advertising data packets 13a, 13b (represented by dashed lines) which are output by various other BLUETOOTH® devices.

If each BLUETOOTH® device has a fixedly set interval In for transmitting information, and there is a maximum interval Imax for all the devices of this category (for example, BLUETOOTH® LE), then each device can determine before the transmission of the first data packet, by scanning the frequency range for a time Tscan≥2×Imax, the times at which and the interval with which other devices in the surroundings which can, under certain circumstances, act as sources of interference for the device's own communication are active. According to at least one disclosed embodiment, the device then selects the starting point of its first data transmission in such a way that it collides with none of the expected data transmission of one of the devices which is found.

Transmitters with the same interval length and multiple can operate completely without interference by selecting the offset. In the case of periods which are not integral multiples, collisions can periodically occur repeatedly (at the smallest common multiple).

There are further possibilities for optimization: if only one finite period is interrogated, it can be optimized further, with the result that the interferences occur at the smallest common multiple outside the transmission time (insofar as the transmission time is shorter than the smallest multiple of both periods).

The scanning can be carried out anew at defined intervals (in transmission pauses of the respective control device during operation).

In the case of BLUETOOTH® LE various advertising methods are in use:
 undirected advertising
 directed low duty cycle advertising and
 directed high duty cycle advertising The two first methods have already implemented a collision avoidance strategy. Nevertheless, embodiments can also be applied for these methods. Disclosed embodiments can be applied to the high duty cycle advertising, but are not restricted thereto.

The maximum interval length in the cases of directed high duty cycle advertising is 3.75 ms. During a method according to at least one disclosed embodiment, only devices which use the "directed high duty cycle advertising" advertising method need to be used for the calculation. These devices operate in an uncorrelated, non-synchronized manner and can be directed to other target devices for the connection setup. It is therefore important to detect all these device with their characteristic data (time of the sensor signals, interval length, MAC address, data packet period). Disclosed embodiments relate to the situation in which the devices are not connected to one another via a BLUETOOTH® network and therefore it is also not possible to exchange any instructions with one another.

Figure 4:
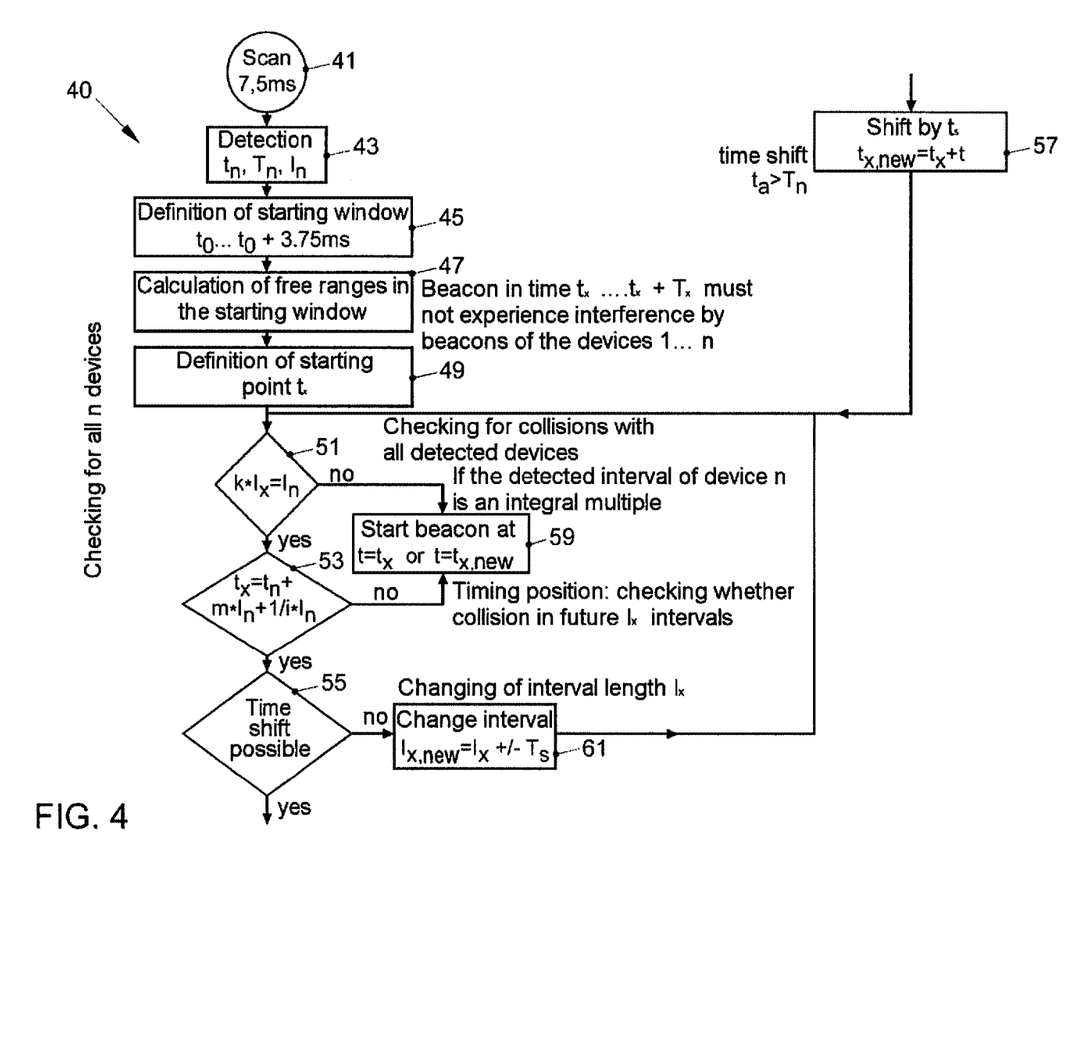
FIG. 4 illustrates a flow chart of a method according to a disclosed embodiment.

FIG. 4 illustrates a flow chart 40 of a method according to a disclosed embodiment. In a method operations at 41, in a specific frequency range in which advertising data packets are intended to be sent, listening or listening in or sampling or scanning is carried out for a predetermined period, here 7.5 ms. During the predetermined period, parameters which characterize the received advertising data packets are detected or determined. These parameters are Tn, specifically the time and the starting of the first beacon or advertising data packet of the device n, are Tn, specifically the beacon period of the device n, and In, specifically the advertising interval of the device n. These parameters are detected in a method operation at 43.

In the method operation at 45, a starting time window (e.g., starting time window 35 in FIG. 3) is defined within which outputting of at least an advertising data packet of the actual device is to take place. After the definition of the starting window, in a method operation at 47 at least one region in the starting window which is free of extraneous advertising data packets is determined. Subsequently, in a method operation at 49 the device's own starting point Tx is defined, the starting point Tx being considered to be a candidate starting point whose suitability is then checked. The following operations are carried out for all the device indices n, such as have been determined as devices in method operation at 41 and which also output advertising data packets.

In an interrogation operation at 51 it is interrogated whether the advertising interval In of the n-th device is an integral multiple of the device's own advertising interval Ix (k*Ix=In, wherein k is an integer). If this is the case, in a further interrogation operation at 53 it is interrogated whether the device's own starting time tx=tn+m. In+1/i. In, wherein m and i are integers, wherein i is, in particular, 1, 2 or 3. If this is the case, a collision would occur at the i-th outputting of the device's own advertising signal. To prevent this collision, in a further interrogation operation at 55 it is determined whether a time shift of the device's own advertising data packets is possible. If this is the case, in a operation at 57 the device's own starting point is shifted by a variable ts to obtain a new starting time txnew=tx+ts, wherein ts>Tn. After the definition of the new starting time, the operation at 51 is repeated again for the new starting time, to determine whether collisions would occur when the starting time is applied. In method operation at 53, i can assume only values between 1 and an i,max, wherein imax can be, for example, 3.

If it is determined in the operation at 51 that the extraneous advertising interval is not an integral multiple of the device's own advertising interval, the device's own advertising data signal is started in the method operation at 59 at the previously defined starting time tx or tx,new. If the condition which is defined in the branching operation at 53 is not satisfied, branching also occurs to the method operation at 59.

If a time shift is not possible in the branching operation at 55, branching occurs into the method operation at 61 in which a new advertising interval is determined, specifically Ix,new=Ix+/−Ts, where Ts can be empirically determined constant or can be determined by further calculation operations. For this newly determined advertising interval, branching occurs again to the branching operation at 51 to determine whether collisions would occur with the changed advertising interval.

LIST OF REFERENCE SYMBOLS 1,3,5,7 BLUETOOTH® device
9 Receiver
10 Antenna
11 Predetermined period
12 Radio signal
13a, 13b Advertising data packets
14 Radio signal
15a,15b Advertising data packets
17a,17b Advertising data packets
19 Processor
21 Transmitter
22a, 22b Device's own advertising data packets
$I_1$, $I_2$ Intervals between advertising data signals
$I_{1a}$, $t_{1a}$ Starting times
$t_{xa}$,$t_{xb}$ Starting times of the device's own advertising data packets
25 Method
27,29,31 Method operations
33 Calculation time
35 Starting time window
41-61 Method operations

The invention claimed is:

1. A method for receiving and outputting radio signals to set up a Bluetooth connection, the method comprising:
    receiving, within a predetermined period, at least two advertising data packets which originate from a device;
    determining starting times of the at least two advertising data packets; and
    outputting, after the predetermined period, the device's own advertising data packets, at device advertising data packet starting times which are determined from the determined starting times of the at least two received advertising data packets such that the device's own advertising data packets do not chronologically overlap with advertising data packets which are output by the device after the predetermined period,
    receiving, within the predetermined period, further advertising data packets which originate from at least one further device; and
    determining starting times of the received further advertising data packets;
    wherein the starting times of the device's own advertising data packets are further selected so that the device's own advertising data packets do not overlap chronologically with the received further advertising data packets which are output by the at least one further device after the predetermined period,
    determining an interval between the at least two received advertising data packets based on their corresponding starting times; and determining at least one further interval between the received further advertising data packets based on their corresponding starting times, wherein the outputting of the device's own advertising data packets takes place periodically, wherein between two of the device's own advertising data packets there is a separate interval which is selected as a function of the determined interval and/or of the determined at least one further interval.

2. The method of claim 1, wherein the receiving of the two advertising data packets and the further advertising data packets comprises:

receiving data packets; and analyzing the received data packets to determine whether the data packets are advertising data packets.

3. The method of claim 1, wherein the receiving of the advertising data packets which originate from the another device and the at least one further device comprises analyzing the advertising data packets to determine a MAC address of the originating device.

4. The method of claim 1, further comprising:

determining a respective data packet period of the at least two advertising data packets and of the further advertising data packets, wherein the outputting of the device's own advertising data packets takes place at the device's own starting times as a function of the data packet period of the at least two advertising data packets and/or that of the further data packets.

5. The method of claim 1, wherein the receiving of the at least two advertising data packets comprises:

listening for the predetermined period on at least one of an advertising frequency range, wherein the outputting of the device's own advertising data packets in the advertising frequency range takes place after the predetermined period, wherein the receiving and outputting take place according to "directed high duty cycle advertising" of Bluetooth Low Energy (BLE).

6. The method of claim 1, wherein the predetermined period is at least twice a maximum interval of periodic outputting of advertising data packets.

7. A method for receiving and outputting radio signals to set up a Bluetooth connection, the method comprising:

receiving, within a predetermined period, at least two advertising data packets which originate from a device;

determining starting times of the at least two advertising data packets; and outputting, after the predetermined period, the device's own advertising data packets, at device advertising data packet starting times which are determined from the determined starting times of the at least two received advertising data packets such that the device's own advertising data packets do not chronologically overlap with advertising data packets which are output by the device after the predetermined period, receiving, within the predetermined period, further advertising data packets which originate from at least one further device;

determining starting times of the received further advertising data packets;

wherein the starting times of the device's own advertising data packets are further selected so that the device's own advertising data packets do not overlap chronologically with the received further advertising data packets which are output by the at least one further device after the predetermined period, wherein the device's own interval is selected such that:

that the device's own interval is an integral multiple of the interval or of the further interval, or in that the interval of the further interval is an integral multiple of the device's own interval, wherein, in response to the interval or the further interval being an integral multiple of the device's own interval, checking is carried out to determine whether an overlap with extraneous advertising data packets will occur when the device's own advertising data packets are output at the device's own starting times at specific times after the starting time window, wherein, in response to determining that an overlap will occur with extraneous advertising data packets, either a time shift of the device's own starting times or a change in the device's own interval is performed.

8. The method of claim 7, wherein the receiving of the two advertising data packets and the further advertising data packets comprises:

receiving data packets; and analyzing the received data packets to determine whether the data packets are advertising data packets.

9. The method of claim 7, wherein the receiving of the advertising data packets which originate from the another device and the at least one further device comprises analyzing the advertising data packets to determine a MAC address of the originating device.

10. The method of claim 7, further comprising:

determining a respective data packet period of the at least two advertising data packets and of the further advertising data packets, wherein the outputting of the device's own advertising data packets takes place at the device's own starting times as a function of the data packet period of the at least two advertising data packets and/or that of the further data packets.

11. The method of claim 7, wherein the receiving of the at least two advertising data packets comprises:

listening for the predetermined period on at least one of an advertising frequency range, wherein the outputting of the device's own advertising data packets in the advertising frequency range takes place after the predetermined period, wherein the receiving and outputting take place according to "directed high duty cycle advertising" of Bluetooth Low Energy (BLE).

12. The method of claim 7, wherein the predetermined period is at least twice a maximum interval of periodic outputting of advertising data packets.

13. A Bluetooth device, comprising:

a receiver to receive, within a predetermined period, at least two advertising data packets which originate from another device;

a processor to determine starting times of the received at least two advertising data packets; and a transmitter to output, after the predetermined period, the device's own advertising data packets at the device's own starting times which are determined by the processor based on the determined starting times of the at least two receiving advertising data packets so that the device's own advertising data packets do not chronologically overlap with advertising data packets which are output by the other device after the predetermined period, wherein the receiver receives, within the predetermined period, further advertising data packets which originate from at least one further device; and wherein the processor determines starting times of the received further advertising data packets;

wherein the starting times of the device's own advertising data packets are further selected so that the device's own advertising data packets do not overlap chronologically with the received further advertising data packets which are output by the transmitter after the predetermined period, wherein the processor determines an interval between the at least two received advertising data packets based on their corresponding starting times; and wherein the processor determines at least one further interval between the received further advertising data packets based on their corresponding starting times, wherein the transmitter outputs the device's own advertising data packets periodically, wherein between two of the device's own advertising data packets there is a separate interval which is selected by the processor as a function of the determined interval and/or of the determined at least one further interval.

14. The Bluetooth device of claim 13, wherein the receiver receives the two advertising data packets and the further advertising data packets by receiving data packets, and analyzing the received data packets to determine whether the data packets are advertising data packets.

15. The Bluetooth device of claim 13, wherein the receiver receives the advertising data packets which originate from the another device and the at least one further device comprises analyzing the advertising data packets to determine a MAC address of the originating device.

16. The Bluetooth device of claim 13, wherein the processor determines a respective data packet period of the at least two advertising data packets and of the further advertising data packets, wherein the transmitter outputs the device's own advertising data packets at the device's own starting times as a function of the data packet period of the at least two advertising data packets and/or that of the further data packets.

17. The Bluetooth device of claim 13, wherein the receiver listens for the predetermined period on at least one of an advertising frequency range, wherein the transmitter outputs the device's own advertising data packets in the advertising frequency range after the predetermined period, wherein the receiver receives and the transmitter outputs according to "directed high duty cycle advertising" of Bluetooth Low Energy (BLE).

18. The Bluetooth device of claim 13, wherein the predetermined period is at least twice a maximum interval of periodic outputting of advertising data packets.

* * * * *